United States Patent [19]
Kao et al.

[11] Patent Number: 5,436,286
[45] Date of Patent: Jul. 25, 1995

[54] NONHALOGEN FLAME-RETARDANT POLYCARBONATE COMPOSITIONS

[75] Inventors: Hsin-Ching Kao; Wen-Jer Chen; Wen-Faa Kuo, all of Hsinchu, Taiwan

[73] Assignee: Industrial Technology Research Institute, Chutung, Taiwan

[21] Appl. No.: 210,148

[22] Filed: Mar. 16, 1994

[51] Int. Cl.$^6$ ............................................. C08K 3/02
[52] U.S. Cl. ........................................................ 524/80
[58] Field of Search ........................ 524/80; 523/205; 525/67

[56] References Cited

U.S. PATENT DOCUMENTS

| | | | |
|---|---|---|---|
| 4,014,849 | 3/1977 | Horn et al. | 524/80 |
| 4,188,313 | 2/1980 | Cerny et al. | 524/80 |
| 4,526,926 | 7/1985 | Weber et al. | 525/67 |
| 4,692,488 | 8/1987 | Kress et al. | |
| 5,026,757 | 6/1991 | Sakon et al. | 524/80 |

FOREIGN PATENT DOCUMENTS

| | | |
|---|---|---|
| 38-15225 | 8/1963 | Japan . |
| 39-71 | 1/1964 | Japan . |
| 42-11496 | 6/1967 | Japan . |
| 62-4746 | 1/1987 | Japan . |
| 62-4747 | 1/1987 | Japan . |
| 63-57667 | 3/1988 | Japan . |
| 2115262 | 4/1990 | Japan . |
| 5-125229 | 5/1993 | Japan . |

OTHER PUBLICATIONS

Joseph Green's paper entitled "Flame Retarding Polycarbonate/ABS Blends with a Brominated Phosphate'-'-Mar. 21, 1991 presented at Fire Retardant Chemicals Asstn. Meeting, Hilton Head, S.C.

*Primary Examiner*—Veronica P. Hoke
*Attorney, Agent, or Firm*—W. Wayne Liauh

[57] ABSTRACT

A nonhalogen flame-retardant polycarbonate composition comprising from 50 to 95% by weight of a polycarbonate resin, from 50 to 5% by weight of an acrylonitrile-butadiene-styrene copolymer resin and from 3 to 10 parts by weight, per one hundred parts by weight of the total weight of polycarbonate resin and acrylonitrile-butadiene-styrene resin, of red phosphorus.

10 Claims, No Drawings

NONHALOGEN FLAME-RETARDANT POLYCARBONATE COMPOSITIONS

BACKGROUND OF THE INVENTION

The present invention relates to a nonhalogen flame-retardant polycarbonate composition comprising red phosphorous as a flame retardant. More particularly, the present invention relates to a nonhalogen flame-retardant polycarbonate composition comprising a polycarbonate resin, an acrylonitrile-butadiene-styrene terpolymer resin and red phosphorous.

Since high molecular plastics, especially engineering plastics, are known to have many advantages such as good physical properties, light-weight materials, low cost and easily processing, they have been gradually substituted for metals and widely utilized in, for example, electronic, mechanical, transportation, aeronautical engineering, biomedicine and architectural industries. Nevertheless, one of the major shortcomings of plastics is that they are easy to burn. Some plastics even produce large amounts of smoke during burning and are harmful to people and environment. Thus the flame-retardancy of plastics used in various industries is strictly provided. For instance, flammability test U.L. Subj. 94 is one test for the flame-retardancy of plastics.

To provide plastics with flame-retardancy, a traditional technique is to introduce halogen-containing flame-retardants in combination with flame-proofing additives such as $Sb_2O_3$ into plastics. Most of such halogen-containing flame-retardants have diphenyl-oxide structures. Although such flame-retardants show significant flame-retardancy during burning, they simultaneously produce large amounts of fatal toxic smoke, i.e. Dioxin which is harmful to people. On the other hand, if polymers including halogen-containing flame-retardants are applied to the housings of monitors of office machines and electric appliances producing heat for long time such as television, dibenzofuran gases are produced and diffused. Therefore, the use of such polymers has been gradually prohibited around the world. For example, the European Community has gradually made laws to prohibit the use of halogen-containing flame-retardants. Since the relevant provisions are stricter than ever and the requirements on performance are upgraded, the high molecular plastics having high heat-resistance and good performance but having no halogen and smoke are required to meet the requirements for commercialized products, i.e. light, thin, short and small.

In recent years, heat stability and impact resistance were required in molding thermoplastic resins which have certain special uses. Therefore, the widely used plastics and ABS resins cannot satisfy these performance requirements. Instead, expensive heat-stable engineering plastics such as polycarbonates, polysulfones and polyphenyleneoxides were developed to solve these problems. Nevertheless, these high performance resins are not only expensive in cost but also are difficult to process. To improve processing properties and heat-resistance, the simplest way is to use polymer blending techniques. For example, ABS/PC polyblends have very balanced mechanical properties and processability. These polyblending techniques have been disclosed in Japanese Patent Application Nos. Sho 38-15225, 39-71 and 42-11496.

Since PC/ABS blends themselves do not have flame retardancy, they are not applicable to the products in electronic, information, mechanical and transportation industries. To improve the flame retardant characteristics of PC/ABS blends, the blends are traditionally admixed with halogen-containing retardants such as decarbromodiphenyl oxide in combination with $Sb_2O_3$. However, such halogen-containing retardants generate large amounts of highly toxic smoke, dioxin. In order to avoid the environmentally harmful effects, plastic materials containing halogenated retardants have been gradually replaced by those containing nonhalogen retardants.

U.S. Pat. No. 4,692,488 discloses the use of phosphates such as triphenyl phosphate as halogen-free retardants for PC/ABS blends. Nevertheless, since the melting point of triphenyl phosphate is only 50°–60° C., if the amount added is large, plasticizing effect and migration phenomenon would occur and the distortion temperature of PC/ABS blends be greatly reduced. Under the circumstances, the field for application of such blends is limited.

Thereafter, General Electric Company in Japanese Laid-Open Application No. Hei 2-115262 discloses the use of arylphosphate monomers as non-halogen retardants for PC/ABS blends. Although the migration phenomenon is improved, these retardants cause a plasticizing effect on PC/ABS blends because the retardants per se are liquid. The high distortion temperature of PC/ABS blends is greatly reduced. The field for application of such retardants is also limited.

Accordingly, to overcome the above problems, the present invention provides a nonhalogen flame-retardant polycarbonate composition comprising a polycarbonate resin, an acrylonitrile-butadiene-styrene copolymer resin and red phosphorus. The composition according to the invention does not exhibit plasticizing effect or migration phenomenon and thus is quite suitable for use as a flame-retardant.

SUMMARY OF THE INVENTION

It is therefore an object of the present invention to provide a retardant for a nonhalogen flame-retardant polycarbonate composition comprising a polycarbonate resin and an acrylonitrile-butadiene-styrene terpolymer resin.

Another object of the present invention is to provide a nonhalogen flame-retardant polycarbonate composition comprising a polycarbonate resin, an acrylonitrile-butadiene-styrene terpolymer resin and red phosphorus in particular ranges.

A further object of the present invention is to provide a nonhalogen flame-retardant polycarbonate composition for the industrial application with high value.

These and other objects, advantages and features of the present invention will be more fully understood and appreciated by reference to the written specification.

DETAILED DESCRIPTION OF THE INVENTION

The present invention relates to the use of red phosphorus as a flame retardant of a nonhalogen flame-retardant polycarbonate composition. Accordingly, the present invention provides a nonhalogen flame-retardant polycarbonate composition comprising a polycarbonate resin, an acrylonitrile-butadiene-styrene terpolymer resin and red phosphorus.

The polycarbonate resins useful in the practice of the present invention include aromatic polycarbonate resins, aliphatic polycarbonate resins, aliphati-caromatic polycarbonate resins and halogen-substituted bisphenol-A polycarbonate resins.

The amount of polycarbonate resin used in the composition is in the range of 50 to 95% by weight of the composition and is preferably in the range of 70 to 90% by weight of the composition.

The ABS resins useful in the practice of the present invention include the resins prepared by emulsion, suspension or solution polymerization of cyanovinyl compounds such as acrylonitrile, conjugated dienes compounds such as butadiene, and aromatic-vinyl compounds such as styrene, and the polyblends prepared by melt blending of the above resins with cyanovinyl-aromatic vinyl copolymers.

The amount of ABS resin in the composition is in the range of 5 to 50% by weight of the composition and is preferably in the range of 10 to 30% by weight of the composition.

Since red phosphorous per se is an inorganic phosphorous, there is no plasticizing effect or migration phenomenon. Thus the high distortion temperatures of PC/ABS blends can be maintained. Besides, since the amount of phosphorus element in red phosphorous is high, the amount of red phosphorus added to PC/ABS blends to achieve superior flame retardancy is reduced. Therefore, the cost of using red phosphorus as a frame retardant is reduced and the field for application of the composition of the invention is wider.

The amount of red phosphorus in the composition is in the range of 3 to 10 parts by weight per one hundred parts by weight of the total weight of polycarbonate resin and acrylonitrite-butadiene-styrene resin and is preferably in the range of 7 to 10 parts by weight per one hundred parts by weight of the total weight of polycarbonate resin and acrylonitrite-butadiene-styrene resin.

The composition according to the present invention may also include other conventional ingredients typically used in the manufacture of plastic materials, such as pigments, fillers, antioxidants and lubricants.

The following examples are offered by way of illustration. The examples are not intended to limit the scope of the invention in any respect and should not be so construed.

EXAMPLES

EXAMPLE 1

Ten parts by weight of red phosphorus, 50% by weight of Lexan -131 from General Electric Company (PC) and 50% by weight of acrylonitrile-butadiene-styrene terpolymer resin (ABS resin) were dried, compounded and blended in a Twin-Screw Extruder at a screw speed of 150 rpm and a temperature of about 230° C., and then pelletized and dried. The resulting material was injection moulded into a test specimen.

The specimen was subjected to the flammability test prescribed by Underwriter Laboratories Inc. (UL-94), the Notched Izod impact strength test prescribed in ASTM D-256, and the heat distortion temperature (HDT) test, prescribed in D-638 respectively. The results are shown in Table 1. In Table 1, the V-0 rating indicates the best flame resistance, the V-1 rating indicates less flame resistance, and the V-2 rating indicates the worse flame resistance.

EXAMPLE 2

The procedures of EXAMPLE 1 were repeated, but 7 parts by weight of red phosphorus, 75% by weight of PC, and 25% by weight of ABS resin were used.. The results are shown in Table 1.

EXAMPLE 3

The procedures of EXAMPLE 1 were repeated, but 5 parts by weight of red phosphorus, 75% by weight of PC, and 25% by weight of ABS resin were used. The results are shown in Table 1.

EXAMPLE 4

The procedures of EXAMPLE 1 were repeated, but 3 parts by weight of red phosphorus, 95% by weight of PC, and 5% by weight of ABS resin were used. The results are shown in Table 1.

COMPARATIVE EXAMPLE 1

The procedures of EXAMPLE 1 were repeated, but 10 parts by weight of triphenyl phosphate (TPP), 50% by weight of PC, and 50% by weight of ABS resin were used. The results are shown in Table 1.

COMPARATIVE EXAMPLE 2

The procedures of EXAMPLE 1 were repeated, but 7 parts by weight of TPP, 75% by weight of PC, and 25% by weight of ABS resin were used. The results are shown in Table 1.

COMPARATIVE EXAMPLE 3

The procedures of EXAMPLE 1 were repeated, but 10 parts by weight of TPP, 75% by weight of PC, and 25 by weight of ABS resin were used. The results are shown in Table 1.

COMPARATIVE EXAMPLE 4

The procedures of EXAMPLE 1 were repeated, but 3 parts by weight of TPP, 95% by weight of PC, and 5% by weight of ABS resin were used. The results are shown in Table 1.

COMPARATIVE EXAMPLE 5

The procedures of EXAMPLE 1 were repeated, but only 50% by weight of PC and 50% by weight of ABS resin were used. The results are shown in Table 1.

COMPARATIVE EXAMPLE 6

The procedures of EXAMPLE 1 were repeated, but only 75% by weight of PC and 25% by weight of ABS resin were used. The results are shown in Table 1.

COMPARATIVE EXAMPLE 7

The procedures of EXAMPLE 1 were repeated, but only 95 by weight of PC and 5% by weight of ABS resin were used. The results are shown in Table 1.

As shown in Table 1, if triphenyl phosphate having a low melting point is used as a retardant, in view,of the plasticizing effect, the HDT of PC/ABS blends is greatly reduced and the flame resistance is poor. Instead, if red phosphorus is used as a retardant, the plastifying effect does not occur so that the high HDT of PC/ABS blends is maintained and only a small amount of red phosphorus can significantly increase the flame resistance of PC/ABS blends. Moreover, the flame retardancy of the PC/ABS blends in which red phosphorus is added is superior to those in which TPP is added.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

TABLE I

| Composition | Example | | | | Comparative Example | | | | | | |
|---|---|---|---|---|---|---|---|---|---|---|---|
| of Properties | 1 | 2 | 3 | 4 | 1 | 2 | 3 | 4 | 5 | 6 | 7 |
| PC | 50 | 75 | 75 | 95 | 50 | 75 | 95 | 95 | 50 | 75 | 95 |
| ABS Resin | 50 | 25 | 25 | 5 | 50 | 25 | 5 | 5 | 50 | 25 | 5 |
| Red Phosphorous | 10 | 7 | 5 | 3 | — | — | — | — | — | — | — |
| TPP | — | — | — | — | 10 | 7 | 10 | 3 | — | — | — |
| UL-94(1/16") | V-O | V-O | V-O | V-O | V-2 | V-2 | V-O | V-2 | HB | HB | HB |
| N-Izod(ft-lb/in) | 7.2 | 8.5 | 8.0 | 3.5 | 9.8 | 9.1 | 4.2 | 4.5 | 12.0 | 12.5 | 4.8 |
| HDT(°C., 264 psi) | 101 | 115 | 119 | 128 | 75 | 82 | 90 | 115 | 103 | 120 | 129 |

We claim:

1. A nonhalogen flame-retardant polycarbonate composition comprising
   (a) 50 to 95% by weight of a polycarbonate resin,
   (b) 50 to 5% by weight of an acrylonitrile-butadiene-styrene terpolymer resin, and
   (c) 3 to 10 parts by weight, per one hundred parts by weight of the total weight of polycarbonate resin and acrylonitrile-butadiene-styrene resin, of red phosphorus.

2. A nonhalogen flame-retardant polycarbonate composition according to claim 1 comprising
   (a) 70 to 90% by weight of a polycarbonate resin.

3. A nonhalogen flame-retardant polycarbonate composition according to claim 1 comprising
   (b) 30 to 10% by weight of an acrylonitrile-butadiene-styrene terpolymer resin.

4. A nonhalogen flame-retardant polycarbonate composition according to claim 1 comprising
   (c) 7 to 10 parts by weight, per one hundred parts by weight of the total weight of polycarbonate resin and acrylonitrile-butadiene-styrene resin, of red phosphorus.

5. A nonhalogen flame-retardant polycarbonate composition according to claim 1 wherein the polycarbonate resin is selected from the group consisting of an aromatic polycarbonate resin, an aliphatic polycarbonate resin, an aliphatic-aromatic polycarbonate resin and a halogen-substituted bisphenol-A polycarbonate resin.

6. A nonhalogen flame-retardant polycarbonate composition, according to claim 1 wherein the acrylonitrile-butadiene-styrene copolymer resin is selected from the group consisting of a resin prepared by emulsion, suspension or solution polymerization of a cyanovinyl compound, a conjugated diene and an aromatic-vinyl compound and a polyblend prepared by melt blending a resin prepared above with a cyanovinyl-aromatic vinyl copolymer.

7. A nonhalogen flame-retardant polycarbonate composition according to claim 6 wherein the cyanovinyl compound is acrylonitrile.

8. A nonhalogen flame-retardant polycarbonate composition according to claim 6 wherein the conjugated diene is butadiene.

9. A nonhalogen flame-retardant polycarbonate composition according to claim 6 wherein the aromatic vinyl compound is styrene.

10. A nonhalogen flame-retardant polycarbonate composition according to claim 1 comprising 60 to 95% by weight of said polycarbonate resin.

* * * * *